United States Patent [19]

Rootsaert et al.

[11] Patent Number: 4,604,233

[45] Date of Patent: Aug. 5, 1986

[54] THICKENED AQUEOUS HYDROCHLORIC ACID COMPOSITION FOR DESCALING, OR TREATMENT OF SUBTERRANEAN FORMATIONS

[75] Inventors: Walter J. M. Rootsaert; Carolus H. van der Loo, both of Badhuisweg, Netherlands

[73] Assignee: Shell Oil Company, Houston, Tex.

[21] Appl. No.: 700,073

[22] Filed: Feb. 11, 1985

Related U.S. Application Data

[63] Continuation of Ser. No. 564,444, Dec. 22, 1983, abandoned.

[30] Foreign Application Priority Data

Dec. 22, 1982 [GB] United Kingdom ............... 8236481

[51] Int. Cl.$^4$ .................... C02F 5/10; C23F 11/00; C23G 1/02
[52] U.S. Cl. ........................ 252/558; 134/3; 166/307; 252/8.55 B; 252/81; 252/82; 252/86; 252/87; 252/559; 252/DIG. 1; 252/8.552; 252/8.553
[58] Field of Search ............... 252/86, 87, DIG. 1, 252/559, 8.55 C, 8.55 B, 82, 81 R, 558; 134/3; 166/307

[56] References Cited

U.S. PATENT DOCUMENTS

| | | | |
|---|---|---|---|
| 3,062,748 | 11/1962 | Harrison | 252/8.55 C |
| 3,353,603 | 11/1967 | Knight | 166/307 |
| 3,779,916 | 12/1973 | Crowe | 252/8.55 C |
| 3,793,221 | 2/1974 | Otrhalek et al. | 252/142 X |
| 3,832,234 | 8/1974 | Otrhalek et al. | 252/142 X |
| 3,968,840 | 7/1976 | Tate | 166/280 |
| 4,032,466 | 6/1977 | Otrhalek et al. | 252/142 X |
| 4,073,344 | 2/1978 | Hall | 166/307 |
| 4,096,914 | 6/1978 | McLaughlin et al. | 166/307 |
| 4,116,713 | 9/1978 | Otrhalek et al. | 134/3 |
| 4,163,727 | 8/1979 | Inks | 252/8.55 C |

FOREIGN PATENT DOCUMENTS 1443244 7/1976 United Kingdom .

Primary Examiner—John E. Kittle
Assistant Examiner—Mukund J. Shah

[57] ABSTRACT

The invention provides a thickened aqueous hydrochloric acid composition comprising
(a) 1 to 20% w hydrogen chloride,
(b) an alcohol ethoxylate of general formula

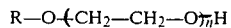

wherein R is a $C_{8-20}$ alkyl group and n has an average value in the range 3 to 15, provided that the $(CH_2-CH_2-O)_n$ moiety constitutes 50 to 67% w of the alcohol ethoxylate,
(c) an alkyl aryl sulfonic acid of general formula

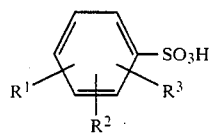

II wherein $R^1$ is a $C_{8-13}$ linear alkyl chain and $R^2$ and $R^3$ independently hydrogen atoms or methyl groups, the combined concentration of (b) and (c) being in the range 3 to 15% w, the relative weight proportions of (b) and (c) being in the range 45 to 65% of (b) to 55 to 35% of (c), and
(d) 0 to 2% w of a salicylate of general formula

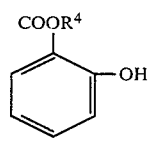

where $R^4$ is a $C_{1-4}$ alkyl or a benzyl group.

The compositions may be used as lime scale removers or in acid treatment of subterranean formations surrounding oil or gas wells.

9 Claims, No Drawings

THICKENED AQUEOUS HYDROCHLORIC ACID COMPOSITION FOR DESCALING, OR TREATMENT OF SUBTERRANEAN FORMATIONS

This is a continuation of application Ser. No. 564,444, filed Dec. 22, 1983, now abandoned.

BACKGROUND OF THE INVENTION

This invention relates to a thickened aqueous hydrochloric acid compositions and to their use as lime scale removers or in acid treatment of subterranean formations surrounding oil or gas wells.

Aqueous hydrochloric acid compositions are known as lime scale removers, e.g., for use in domestic and institutional applications. French Patent Application Publication No. 2,207,984 discloses the use of a tertiary amine ethoxylate as a thickener in such compositions.

Use of aqueous hydrochloric acid compositions in acid treatment of subterranean formations surrounding oil or gas wells, to increase fluid permeability of the formations, is also known. Such composition are generally used in carbonate formations such as limestone or dolomite, and may be employed in acid fracturing or in matrix acidizing techniques. In acid fracturing, acid is injected at a pressure sufficient to cause the formation to rupture, thereby creating a fracture extending a relatively long distance from the well. Conductive channels are then formed by acid etching of the carbonate fracture walls. Matrix acidizing is effected by injection of acid at lower pressures so that fracturing does not occur. The acid attacks the carbonate formation and etches channels which radiate outwardly from the well. Such channels are commonly referred to as wormholes. The use of hydrochloric acid compositions in such techniques is disclosed in for example U.S. Pat. Nos. 3,734,186, 3,353,603, 3,831,679 and 4,073,344.

Thickened aqueous hydrochloric acid compositions particularly suitable for external cleaning of vehicles such as railroad rolling stock are described in U.S. Pat. No. 3,793,221. These aqueous compositions comprise hydrogen chloride, an organic acid (one or more of oxalic, tartaric and citric acids), a non-ionic surfactant and an anionic surfactant. Inter alia the non-ionic surfactant may be an alkylene oxide adduct of a higher aliphatic alcohol. Linear alkylbenzene sulfonic acids are preferred anionic surfactants. It is stated to be critical to the success of the compositions that the non-ionic portion of the total surfactant be from about 75 to about 95 weight percent.

Desirable properties in a thickened aqueous hydrochloric acid composition for use in acid treatment of subterranean formations surrounding oil or gas wells include: viscosity to decrease at higher rates of shear (must not exhibit Weissenberg effect), viscosity to be low when acid is spent, and stability of the acid composition to be good.

There has now been discovered, a relatively narrow class of thickened hydrochloric acid compositions exhibiting particularly desirable properties.

According to the present invention therefore there is provided a thickened aqueous hydrochloric acid composition comprising:

(a) 1 to 20 percent by weight (%w) hydrogen chloride,
(b) an alcohol ethoxylate of the formula

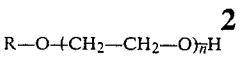
(I)

wherein R is a $C_{8-20}$ alkyl group and n has an average value in the range 3 to 15, provided that the $(CH_2-CH_2-O)_n$ moiety constituents 50 to 67%w of the alcohol ethoxylate, (c) an alkyl aryl sulfonic acid of the formula

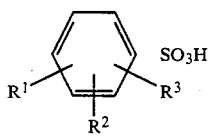
(II)

wherein $R^1$ is a $C_{8-13}$ linear alkyl chain and $R^2$ and $R^3$ are independently hydrogen atoms or methyl groups, the combined concentration of (b) and (c) being in the range 3 to 15%w, the relative weight proportions of (b) and (c) being in the range 45 to 65% of (b) to 55 to 35% of (c), and (d) 0 to 2%w of a salicylate of the formula

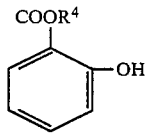

where $R^4$ is a $C_{1-14}$ alkyl or a benzyl group.

Preferably the composition comprises at least 2%w, advantageously at least 5%w hydrogen chloride; 5 to 15%w hydrogen chloride is particularly preferred, 10 to 15%w hydrogen chloride being most preferred.

It is preferred for R to be a $C_{8-18}$ alkyl group.

Those skilled in the art will appreciate that due to commercial methods of production there may be a degree of unsaturation associated with the alkyl groups R and $R^1$ in the compounds of formula I and/or II, and there may be branching in the $R^1$ group in a minor proportion of the compound of formula II.

The combined concentration of (b) and (c) is preferably in the range 5 to 12%w.

Inclusion of small quantities of a salicylate of the above general formula have been found to confer increased viscosity upon compositions of the invention. Accordingly if a composition of a specified desired viscosity is to be prepared it may be commercially advantageous in some cases to include a quantity, e.g., between about 0.1 and 2.0%w, of a salicylate. The combined concentration of (b) and (c) may then typically be reduced without disadvantage. Preferably the salicylate will be present in an amount ranging from 0.25 to 1%w, conveniently about 0.5%w.

The salicylate may suitably, but not necessarily, be methyl, ethyl or benzyl salicylate. Methyl salicylate has been found to be very effective.

Compositions according to the invention may be prepared, for instance, by mixing the alcohol ethoxylate and the alkyl benzene sulfonic acid and dispersing the resulting blend, together with the salicylate when present, in aqueous hydrochloric acid. If desired the alkyl benzene sulfonic acid may be added in salt form, e.g., as the sodium sulfonate, and it will be appreciated that in the resulting composition it will be in the form of the acid.

Depending on the eventual desired use, the compositions may contain an additional component or components such as dyes, perfumes, germicides, sulfuric acid or phosphoric acid.

The invention further includes the use of a composition of the invention as a lime scale remover, e.g., for use in domestic and institutional applications such as cleaning of sanitary apparatus (e.g., lavatories, wash basins and baths), ceramic tiled surfaces, dishwashers and washing machines, or in acid treatment of subterranean formations surrounding oil or gas wells. In acid treatment of subterranean formations, the alcohol ethoxylate, alkyl benzene sulfonic acid and, when used, the salicylate may be added to the hydrochloric acid by means of an in-line blender.

The invention will be further understood from the following examples, in which parts or percentages are by weight unless otherwise indicated.

EXAMPLES 1 TO 8

Aqueous emulsions were prepared containing hydrochloric acid, an alcohol ethoxylate and an alkylbenzene sulfonic acid. The alcohol ethoxylate and alkylbenzene sulfonic acid were blended together and the resulting emulsifier blend was dispersed in aqueous hydrochloric acid in proportions such that the resulting emulsions contained 15%w of hydrogen chloride and 9%w of emulsifier blend.

Alcohol ethoxylates used were of formula $R-O-CH_2-CH_2-O)_nH$ as follows:

i. An alcohol ethoxylate wherein R is $C_9$ to $C_{11}$ alkyl and n is 6, having a mass ratio alcohol:ethylene oxide 37.7:62.3 ("DOBANOL 91-6") ("DOBANOL" is a registered trademark).

ii. An alcohol ethoxylate wherein R is $C_9$ to $C_{11}$ alkyl and n is 5, having a mass ratio alcohol:ethylene oxide 42.1:57.9 ("DOBANOL 91-5").

iii. An alcohol ethoxylate wherein R is $C_{12}$ to $C_{15}$ alkyl and n is 9, having a mass ratio alcohol:ethylene oxide 34:66 ("DOBANOL 25-9").

Alkylbenzene sulfonic acids were linear alkylbenzene sulfonic acids of the formula $R^1-C_6H_4-SO_3H$ as follows:

A. A linear alkylbenzene sulfonic acid wherein $R^1$ is a $C_{10}$ to $C_{12}$ alkyl group ("DOBANIC acid 102") ("DOBANIC" is a registered trademark).

B. A linear alkylbenzene sulfonic acid wherein $R^1$ is a $C_{10}$ to $C_{13}$ alkyl group ("DOBANIC acid JN").

C. A linear alkylbenzene sulfonic acid wherein $R^1$ is a $C_8$ to $C_{13}$ alkyl group ("DOBANIC acid 83").

For comparison purposes emulsions containing sucrose and triethylene glycol (TEG) in place of the alcohol ethoxylate were also prepared.

The emulsions all remained stable on storage for 14 days at ambient temperature (20° C.). Viscosity measurements were made after 3 days, at ambient temperature, using a Brookfield viscometer (spindle 2). Results are given in Table I.

TABLE I

| | Alcohol ethoxylate | | alkylbenzene sulfonic acid | | Brookfield viscosities (Pa·s) at r.p.m. | | |
|---|---|---|---|---|---|---|---|
| Example | type | % w | type | % w | 1.5 | 6 | 30 |
| 1 | i | 5 | A | 4 | 2.20 | 0.82 | 0.31 |
| 2 | iii | 5 | A | 4 | — | — | — |
| 3 | ii | 5 | A | 4 | 2.50 | 0.95 | 0.44 |
| 4 | ii | 4.9 | A | 4.1 | — | — | — |
| 5 | i | 5 | B | 4 | 2.70 | 0.91 | 0.31 |
| 6 | i | 5.1 | B | 3.9 | — | — | — |

TABLE I-continued

| | Alcohol ethoxylate | | alkylbenzene sulfonic acid | | Brookfield viscosities (Pa·s) at r.p.m. | | |
|---|---|---|---|---|---|---|---|
| Example | type | % w | type | % w | 1.5 | 6 | 30 |
| 7 | i | 5 | C | 4 | 2.05 | 0.68 | 0.23 |
| 8 | i | 5.2 | C | 3.8 | — | — | — |
| comparative i* | sucrose | 4.6 | A | 4.4 | 0.44 | 0.24 | — |
| comparative ii | TEG | 2.9 | A | 6.1 | 1.50 | 0.60 | * |

— = not measured
* = exhibited Weissenberg effect, i.e., at higher shear rates viscosity increases considerably An emulsion employing 5.9%w of alcohol ethoxylate iii and 3.1%w of alkylbenzene sulfonic acid A was unstable. Other emulsions which were unstable contained 5%w or 5.5%w of an alcohol ethoxylate wherein R is $C_9$ to $C_{11}$ alkyl and n is 8, having a mass ratio alcohol:ethylene oxide 31.3:68.7 ("DOBANOL 91-8"), and 4%w or 3.5%w respectively of acid A; contained 5%w or 4.5%w of an alcohol ethoxylate wherein R is $C_{12}$ to $C_{15}$ and n is 3, having a mass ratio alcohol:ethylene oxide 61:39 ("DOBANOL 25-3"), and 4%w or 4.5%w respectively of acid A; or contained 5%w or 3.9%w of an alcohol ethoxylate wherein R is $C_9$ to $C_{11}$ and n averages 2.5, having a mass ratio alcohol:ethylene oxide 59.3:40.7 ("DOBANOL 91-2.5"), and 4%w or 5.1%w of acid A.

EXAMPLES 9 AND 10

An emulsifier blend was prepared containing alcohol ethoxylate i and alkylbenzene sulfonic acid A in a weight ratio of 5:4. This emulsifier blend was used to prepare, in addition to the emulsion of Example 1, emulsions containing 15%w of hydrogen chloride and 7%w and 12%w of emulsifier blend respectively.

The resulting emulsions were all stable on storage for 14 days at ambient temperature. Viscosity measurements were made after 3 days, at ambient temperature, using a Brookfield viscometer (spindle 3). Results are given in Table II.

TABLE II

| | % w 5:4 w/w alcohol ethoxylate: alkylbenzene sulfonic acid | Brookfield viscosities (Pa·s) at r.p.m. | | |
|---|---|---|---|---|
| Example | blend in emulsion | 1.5 | 6 | 30 |
| 1 | 9 | 2.16 | 0.82 | 0.308 |
| 9 | 7 | 0.96 | 0.38 | 0.152 |
| 10 | 12 | 10.80 | 3.42 | 0.952 |

By comparison, when the above emulsifier blend was dispersed in deionized water at concentrations of 10% and 15%w blend, the resulting dispersions were not thixotropic, and the resulting clear solutions were only slightly thickened (Brookfield viscosities 0.005 and 0.10 Pa.s at 1.5 r.p.m).

EXAMPLE 11 TO 13

Proportions of the emulsifier blend used in Examples 1, 9 and 10 and methyl salicylate were dispersed in aqueous hydrochloric acid to give emulsions containing 12%w of hydrogen chloride, 0.5%w of methyl salicylate and 5%w, 7%w and 9%w of emulsifier blend respectively.

The resulting emulsions were all stable on storage for 14 days at ambient temperature. Viscosity measurements were made using the procedure of Examples 9 and 10. Results are given in Table III.

TABLE III

| Example | % w emulsifier blend in emulsion | Brookfield viscosities (Pa·s) at r.p.m. | | |
|---|---|---|---|---|
| | | 1.5 | 6 | 30 |
| 11 | 5 | 0.800 (2.880) | 0.840 (1.240) | 0.532 (0.548) |
| 12 | 7 | 1.440 (2.160) | 0.760 (1.040) | 0.372 (0.432) |
| 13 | 9 | 3.200 (4.240) | 1.360 (1.800) | 0.592 (0.680) |

Figures in brackets demonstrate hysteresis as spindle is slowed through r.p.m. range from maximum of 60 r.p.m.

EXAMPLES 14 AND 15

Following the procedure employed in Examples 1 to 8, aqueous emulsions were prepared containing 15%w of hydrogen chloride and 9%w of an emulsifier blend of "Tallow 11 EO" and alkylbenzene sulfonic acid A. The emulsions all remained stable on storage for 14 days at ambient temperature (20° C.). Viscosity measurements were made after 3 days, at ambient temperature, using a Brookfield viscometer (spindle 2). Results are given in Table IV.

"Tallow 11-EO" is an ethoxylate of tallow alcohol (a blend of 30%w of n-hexadecanol and 70%w of n-octadecanol) having the formula: $R-O-(CH_2-CH_2-O)_{\overline{n}}H$ wherein R is $C_{16}$ to $C_{18}$ alkyl and n averages 11, the mass ratio alcohol:ethylene oxide being 35:65.

TABLE IV

| Example | % w "Tallow 11-EO" | % w Acid A | Brookfield viscosities (Pa·s) at r.p.m. | | |
|---|---|---|---|---|---|
| | | | 1.5 | 6 | 30 |
| 14 | 4.24 | 4.76 | 1.72 | 0.75 | 0.30 |
| 15 | 5 | 4 | 0.72 | 0.34 | 0.15 |

EXAMPLE 16

Following the procedure employed in Examples 1 to 8, an aqueous emulsion was prepared containing 15%w of hydrogen chloride and 5%w of alcohol ethoxylate i and 4%w of a linear alkyl xylene sulfonic acid of formula

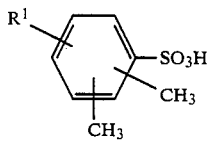

wherein $R^1$ is a $C_8$ to $C_{10}$ alkyl group. The emulsion remained stable on storage for 14 days at ambient temperature (20° C.). Viscosity measurements made after 3 days at ambient temperature using a Brookfield viscometer (spindle 2) gave viscosity at 1.5 r.p.m. of 2.11 Pa.s, at 6 r.p.m. of 0.76 Pa.s and at 30 r.p.m. of 0.29 Pa.s.

EXAMPLE 17

Following the procedure employed in Examples 1 to 8, an aqueous emulsion was prepared containing 15%w of hydrogen chloride and 9%w of an emulsifier blend of "DOBANOL 91-4" and acid A in relative weight proportions 60:40. The emulsion was stable on storage for 14 days at ambient temperature (20° C.). Viscosity measurements made after 3 days, at ambient temperature, using a Brookfield viscometer (spindle 2) gave viscosity at 1.5 r.p.m. of 1.35 Pa.s, at 6 r.p.m. of 0.55 Pa.s and at 30 r.p.m. of 0.23 Pa.s.

"DOBANOL 91-4" is an alcohol ethoxylate wherein R is $C_9$ to $C_{11}$ alkyl and n is 4, having a mass ratio alcohol:ethylene oxide 47.6:52.4.

EXAMPLE 18

Following the procedure employed in Examples 1 to 8 an emulsion was prepared containing 15%w of hydrogen chloride and 9%w of an emulsifier blend of "DOBANOL 23-5" and acid A in relative weight proportions 65:35. The emulsions was stable on storage for 14 days at ambient temperature (20° C.). Viscosity measurements made after 3 days, at ambient temperature, using a Brookfield viscometer (spindle 2) gave viscosity at 1.5 r.p.m. of 0.79 Pa.s, at 6 r.p.m. of 0.35 Pa.s, and at 30 r.p.m. of 0.16 Pa.s.

"DOBANOL 23-5" is an alcohol ethoxylate wherein R is $C_{12}$ to $C_{13}$ alkyl and n is 5, having a mass ratio alcohol:ethylene oxide 46.7:53.3.

EXAMPLES 19 TO 25

The emulsifier blend employed in Examples 1, and 9 to 13 and methyl salicylate were dispersed in aqueous hydrochloric acid to give emulsions containing 9%w of the emulsifier blend, 0.5%w of methyl salicylate, and various concentrations of hydrogen chloride.

Emulsions containing up to 20%w of hydrogen chloride were all stable on storage for a week at ambient temperature, whereas emulsions containing 25%, 30% and 35%w hydrogen chloride were unstable. Viscosity measurements were made after 3 days, at ambient temperature, using a Brookfield viscometer (spindle 2). Results are given in Table V.

TABLE V

| Example | % w HCl | Viscosity (Pa·s) at r.p.m. | | |
|---|---|---|---|---|
| | | 1.5 | 6 | 30 |
| 19 | 1 | 0.28 | 0.15 | 0.06 |
| 20 | 2 | 0.91 | 0.33 | 0.13 |
| 21 | 3 | 2.07 | 0.72 | 0.26 |
| 22 | 5 | 2.15 | 0.76 | 0.31 |
| 23 | 10 | 2.69 | 0.94 | 0.32 |
| 24 | 15 | 2.62 | 0.96 | 0.26 |
| 25 | 20 | 0.84 | 0.33 | 0.13 |
| comparative | 0 | 0 | 0.01 | 0.008 |

What is claimed is:

1. A thickened aqueous hydrochloric acid composition comprising
   (a) 5 to 15%w hydrogen chloride,
   (b) an alcohol ethoxylate of the formula $R-O-(CH_2-CH_2-O)_{\overline{n}}H$ wherein R is a $C_{8-18}$ alkyl group and n has an average value in the range 3 to 15, provided that the $(CH_2-CH_2-O)_n$ moiety constitutes 50 to 67%w of the alcohol ethoxylate,
   (c) an alkyl aryl sulfonic acid of the formula

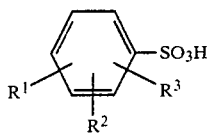

wherein $R^1$ is a $C_{8-13}$ linear alkyl chain and $R^2$ and $R^3$ are independently hydrogen atoms or methyl groups, the combined concentration of (b) and (c) being in the range 5 to 12%w, the relative weight proportions of (b) and (c) being in the range 45 to 65% of (b) to 55 to 35% of (c), and (d) 0.25 to 1%w of a salicylate of the formula

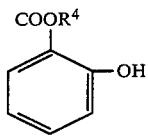

where $R^4$ is a $C_{1-4}$ alkyl or a benzyl group.

2. A composition according to claim 1, wherein the salicylate is methyl salicylate.

3. A thickened aqueous hydrochloric acid composition comprising (a) 1 to 20%w hydrogen chloride,
(b) an alcohol ethoxylate of the formula

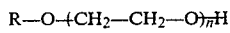

wherein R is a $C_{8-20}$ alkyl group and n has an average value in the range 3 to 15, provided that the $(CH_2-CH_2-O)_n$ moiety constitutes 50 to 67%w of the alcohol ethoxylate, (c) an alkyl aryl sulfonic acid of the formula

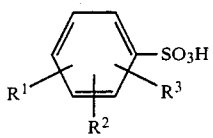

wherein $R^1$ is a $C_{8-13}$ linear alkyl chain and $R^2$ and $R^3$ are independently hydrogen atoms or methyl groups, the combined concentration of (b) and (c) being in the range 3 to 15%w, the relative weight proportions of (b) and (c) being in the range 45 to 65% of (b) to 55 to 35% of (c), and (d) 0.1 to 2%w of a salicylate of the formula

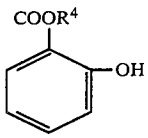

where $R^4$ is a $C_{1-4}$ alkyl or a benzyl group.

4. A composition according to claim 3, which comprises 5 to 15%w hydrogen chloride.

5. A composition according to claim 4, wherein in the alcohol ethoxylate R is a $C_{8-18}$ alkyl group.

6. A composition according to claim 5, wherein the combined concentration of (b) and (c) is in the range 5 to 12%w.

7. A composition according to claim 6, wherein the salicylate is methyl salicylate.

8. Use of a composition of claim 3 as a line scale inhibitor.

9. Use of a composition of claim 3 in acid treatment of subterranean formations surrounding oil or gas wells.

* * * * *